(12) United States Patent
Krichtafovitch et al.

(10) Patent No.: US 9,746,180 B2
(45) Date of Patent: Aug. 29, 2017

(54) MULTIJET BURNER WITH CHARGE INTERACTION

(71) Applicant: ClearSign Combustion Corporation, Seattle, WA (US)

(72) Inventors: Igor A. Krichtafovitch, Kirkland, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 843 days.

(21) Appl. No.: 14/092,857

(22) Filed: Nov. 27, 2013

(65) Prior Publication Data

US 2014/0162197 A1     Jun. 12, 2014

Related U.S. Application Data

(60) Provisional application No. 61/775,185, filed on Mar. 8, 2013, provisional application No. 61/730,486, filed on Nov. 27, 2012.

(51) Int. Cl.
*F23N 5/00*     (2006.01)
*F23C 99/00*    (2006.01)
(Continued)

(52) U.S. Cl.
CPC .............. *F23N 5/00* (2013.01); *F23C 99/001* (2013.01); *F23D 14/84* (2013.01); *F23D 23/00* (2013.01); *Y02T 50/677* (2013.01)

(58) Field of Classification Search
CPC . F23N 5/00; F23D 14/84; F23D 23/00; F23C 99/001
(Continued)

(56) References Cited

U.S. PATENT DOCUMENTS 1,153,182 A   9/1915   Schniewind
2,604,936 A   7/1952   Kaehni et al.
(Continued)

FOREIGN PATENT DOCUMENTS

EP   1139020    8/2006
FR   2577304    12/1989
(Continued)

OTHER PUBLICATIONS

James Lawton and Felix J. Weinberg. "Electrical Aspects of Combustion." Clarendon Press, Oxford. 1969, p. 81.
(Continued)

*Primary Examiner* — Avinash Savani
*Assistant Examiner* — Rabeeul Zuberi
(74) *Attorney, Agent, or Firm* — Christopher A. Wiklof; Launchpad IP, Inc.

(57) ABSTRACT

A multijet burner system includes a plurality of fuel nozzles, each configured to support a respective flame, a plurality of charge electrodes, each positioned and configured to apply a charge potential to a fluid flow corresponding to a respective one of the plurality of fuel nozzles, and a charge controller operatively coupled to each of the plurality of charge electrodes and configured to control a voltage potential applied to each respective charge electrode. By selecting the magnitude and polarity of a charge potential applied to individual ones of the flames of the plurality of burners, the flames can be made to change positions, move to selected positions, and redistribute themselves within a volume.

41 Claims, 4 Drawing Sheets

(51) Int. Cl.
*F23D 14/84* (2006.01)
*F23D 23/00* (2006.01)

(58) Field of Classification Search
USPC .................. 361/231; 431/253, 9; 422/186
See application file for complete search history.

(56) References Cited

U.S. PATENT DOCUMENTS

| | | | |
|---|---|---|---|
| 3,087,472 A | 4/1963 | Asakawa |
| 3,167,109 A | 1/1965 | Wobig |
| 3,224,485 A | 12/1965 | Blomgren et al. |
| 3,252,885 A | 5/1966 | Griswold |
| 3,306,338 A | 2/1967 | Wright et al. |
| 3,358,731 A | 12/1967 | Donnelly |
| 3,416,870 A | 12/1968 | Wright |
| 3,503,348 A | 3/1970 | Dvirka |
| 3,749,545 A | 7/1973 | Velkoff |
| 3,841,824 A | 10/1974 | Bethel |
| 3,869,362 A | 3/1975 | Machi et al. |
| 3,894,834 A | 7/1975 | Estes |
| 4,020,388 A | 4/1977 | Pratt, Jr. |
| 4,052,139 A | 10/1977 | Paillaud et al. |
| 4,091,779 A | 5/1978 | Saufferer et al. |
| 4,093,430 A | 6/1978 | Schwab et al. |
| 4,110,086 A | 8/1978 | Schwab et al. |
| 4,111,636 A | 9/1978 | Goldberg |
| 4,118,202 A | 10/1978 | Scholes |
| 4,219,001 A | 8/1980 | Kumagai et al. |
| 4,239,973 A | 12/1980 | Kolbe et al. |
| 4,260,394 A | 4/1981 | Rich |
| 4,304,096 A | 12/1981 | Liu et al. |
| 4,340,024 A | 7/1982 | Suzuki et al. |
| 4,439,980 A | 4/1984 | Biblarz et al. |
| 4,626,876 A | 12/1986 | Miyagawa et al. |
| 4,649,260 A | 3/1987 | Melis et al. |
| 4,652,318 A | 3/1987 | Masuda et al. |
| 4,675,029 A | 6/1987 | Norman et al. |
| 4,903,616 A | 2/1990 | Mavroudis |
| 4,910,637 A | 3/1990 | Hanna |
| 4,962,307 A | 10/1990 | Nakaya |
| 4,987,839 A | 1/1991 | Krigmont et al. |
| 5,515,681 A | 5/1996 | DeFreitas |
| 5,702,244 A | 12/1997 | Goodson et al. |
| 5,977,716 A | 11/1999 | Motouchi |
| 6,640,549 B1 | 11/2003 | Wilson et al. |
| 6,736,133 B2 | 5/2004 | Bachinski et al. |
| 6,742,340 B2 | 6/2004 | Nearhoof, Sr. et al. |
| 6,769,420 B1 | 8/2004 | Motouchi |
| 6,918,755 B1 | 7/2005 | Johnson et al. |
| 7,137,808 B2 | 11/2006 | Branston et al. |
| 7,168,427 B2 | 1/2007 | Bachinski et al. |
| 7,182,805 B2 | 2/2007 | Reaves |
| 7,226,496 B2 | 6/2007 | Ehlers |
| 7,226,497 B2 | 6/2007 | Ashworth |
| 7,243,496 B2 | 7/2007 | Pavlik et al. |
| 7,377,114 B1 | 5/2008 | Pearce |
| 7,679,026 B1 | 3/2010 | Gefter et al. |
| 7,845,937 B2 | 12/2010 | Hammer et al. |
| 7,927,095 B1 | 4/2011 | Chorpening et al. |
| 8,082,725 B2 | 12/2011 | Younsi et al. |
| 8,245,951 B2 | 8/2012 | Fink et al. |
| 8,851,882 B2 | 10/2014 | Hartwick et al. |
| 9,284,886 B2 | 3/2016 | Breidenthal et al. |
| 9,310,077 B2 | 4/2016 | Breidenthal et al. |
| 2004/0011378 A1 | 1/2004 | Jackson |
| 2005/0208442 A1 | 9/2005 | Heiligers et al. |
| 2006/0054821 A1 | 3/2006 | Salvermoser et al. |
| 2006/0165555 A1 | 7/2006 | Spielman et al. |
| 2007/0020567 A1 | 1/2007 | Branston et al. |
| 2008/0145802 A1 | 6/2008 | Hammer et al. |
| 2010/0175655 A1 | 7/2010 | Lykowski |
| 2010/0282185 A1* | 11/2010 | Sanchez-Molinero . F23C 7/002 122/17.1 |
| 2011/0094710 A1 | 4/2011 | Choudhary et al. |
| 2011/0111354 A1 | 5/2011 | Videto et al. |
| 2011/0203771 A1 | 8/2011 | Goodson et al. |
| 2011/0242729 A1 | 10/2011 | Silvi et al. |
| 2011/0261499 A1 | 10/2011 | Hizer et al. |
| 2012/0317985 A1 | 12/2012 | Hartwick et al. |
| 2013/0004902 A1 | 1/2013 | Goodson et al. |
| 2013/0071794 A1 | 3/2013 | Colannino et al. |
| 2013/0170090 A1 | 7/2013 | Colannino et al. |
| 2013/0230810 A1 | 9/2013 | Goodson et al. |
| 2013/0230811 A1 | 9/2013 | Goodson et al. |
| 2013/0255482 A1 | 10/2013 | Goodson |
| 2013/0255548 A1 | 10/2013 | Goodson et al. |
| 2013/0255549 A1 | 10/2013 | Sonnichsen et al. |
| 2013/0260321 A1 | 10/2013 | Colannino et al. |
| 2013/0291552 A1 | 11/2013 | Smith et al. |
| 2013/0323655 A1 | 12/2013 | Krichtafovitch et al. |
| 2013/0323661 A1 | 12/2013 | Goodson et al. |
| 2013/0333279 A1 | 12/2013 | Osler et al. |
| 2013/0336352 A1 | 12/2013 | Colannino et al. |
| 2014/0050644 A1 | 2/2014 | Colannino et al. |
| 2014/0051030 A1 | 2/2014 | Colannino et al. |
| 2014/0065558 A1 | 3/2014 | Colannino et al. |
| 2014/0076212 A1 | 3/2014 | Goodson et al. |
| 2014/0080070 A1 | 3/2014 | Krichtafovitch et al. |
| 2014/0162195 A1 | 6/2014 | Lee et al. |
| 2014/0170569 A1 | 6/2014 | Anderson et al. |
| 2014/0170571 A1 | 6/2014 | Casasanta, III et al. |
| 2014/0170576 A1 | 6/2014 | Colannino et al. |
| 2014/0170577 A1 | 6/2014 | Colannino et al. |
| 2014/0186778 A1 | 7/2014 | Colannino et al. |
| 2014/0196368 A1 | 7/2014 | Wiklof |
| 2014/0196369 A1 | 7/2014 | Wiklof |
| 2014/0208758 A1 | 7/2014 | Breidenthal et al. |
| 2014/0212820 A1 | 7/2014 | Colannino et al. |
| 2014/0216401 A1 | 8/2014 | Colannino et al. |
| 2014/0227645 A1 | 8/2014 | Krichtafovitch et al. |
| 2014/0227646 A1 | 8/2014 | Krichtafovitch et al. |
| 2014/0227649 A1 | 8/2014 | Krichtafovitch et al. |
| 2014/0234786 A1 | 8/2014 | Ruiz et al. |
| 2014/0234789 A1 | 8/2014 | Ruiz et al. |
| 2014/0248566 A1 | 9/2014 | Krichtafovitch et al. |
| 2014/0251191 A1 | 9/2014 | Goodson et al. |
| 2014/0255855 A1 | 9/2014 | Krichtafovitch |
| 2014/0255856 A1 | 9/2014 | Colannino et al. |
| 2015/0079524 A1 | 3/2015 | Colannino et al. |
| 2015/0107260 A1 | 4/2015 | Colannino et al. |
| 2015/0118629 A1 | 4/2015 | Colannino et al. |
| 2015/0121890 A1 | 5/2015 | Colannino et al. |
| 2015/0140498 A1 | 5/2015 | Colannino |
| 2015/0147705 A1 | 5/2015 | Colannino et al. |
| 2015/0219333 A1 | 8/2015 | Colannino et al. |
| 2015/0241057 A1 | 8/2015 | Krichtafovitch et al. |
| 2015/0338089 A1 | 11/2015 | Krichtafovitch et al. |
| 2015/0345780 A1 | 12/2015 | Krichtafovitch |
| 2015/0345781 A1 | 12/2015 | Krichtafovitch et al. |
| 2015/0362178 A1 | 12/2015 | Karkow et al. |
| 2016/0123576 A1 | 5/2016 | Colannino et al. |
| 2016/0161115 A1 | 6/2016 | Krichtafovitch et al. |

FOREIGN PATENT DOCUMENTS

| | | |
|---|---|---|
| GB | 1042014 | 9/1966 |
| JP | 58-019609 | 2/1983 |
| JP | 60-216111 | 10/1985 |
| JP | 61-265404 | 11/1986 |
| JP | 07-293868 | 11/1995 |
| JP | 2001-021110 | 1/2001 |
| JP | 2001-027413 | 1/2001 |
| WO | WO 2004/083728 | 9/2004 |
| WO | WO 2013/181569 | 12/2013 |

OTHER PUBLICATIONS

PCT International Search Report and Written Opinion of PCT/US2013/072427 mailed Mar. 11, 2014.
Altendrfner et al., "Electric Field Effects on Emissions and Flame Stability With Optimized Electric Field Geometry", Third European Combustion Meeting ECM 2007, p. 1-6.

(56) References Cited

OTHER PUBLICATIONS

William T. Brande; "The Bakerian Lecture: On Some New Electro-Chemical Phenomena", Phil. Trans. R. Soc. Lond. 1814 104, p. 51-61.
James Lawton and Felix J. Weinberg. "Electrical Aspects of Combustion". Clarendon Press, Oxford. 1969.

* cited by examiner

MULTIJET BURNER WITH CHARGE INTERACTION

CROSS-REFERENCE TO RELATED APPLICATIONS

The present application claims priority benefit from U.S. Provisional Patent Application No. 61/775,185 entitled "MULTIJET BURNER WITH CHARGE INTERACTION," filed Mar. 8, 2013; and U.S. Provisional Patent Application No. 61/730,486 entitled "MULTISTAGE IONIZER FOR A COMBUSTION SYSTEM," filed Nov. 27, 2012; each of which, to the extent not inconsistent with the disclosure herein, are each incorporated by reference.

The following U.S. Patent Applications, filed concurrently herewith, are directed to subject matter that is related to or has some technical overlap with the subject matter of the present disclosure, and are incorporated herein by reference, in their entireties: U.S. patent application Ser. No. 14/092,911, entitled "ELECTRODYNAMIC BURNER WITH A FLAME IONIZER," filed Nov. 27, 2013; U.S. patent application Ser. No. 14/092,836, entitled "PRECOMBUSTION IONIZATION" filed Nov. 27, 2013; U.S. patent application Ser. No. 14/092,814, entitled "CHARGED ION FLOWS FOR COMBUSTION CONTROL;" filed Nov. 27, 2013; U.S. patent application Ser. No. 14/092,896, entitled "IONIZER FOR A COMBUSTION SYSTEM, INCLUDING FOAM ELECTRODE STRUCTURE," filed Nov. 27, 2013; and U.S. patent application Ser. No. 14/092,876, entitled "MULTISTAGE IONIZER FOR A COMBUSTION SYSTEM," filed Nov. 27, 2013.

BACKGROUND

The present disclosure is related to processes and systems that employ flames, and in particular to systems that employ multiple jet burners.

Multijet burners are employed in a wide range of systems, in many commercial, industrial, and domestic applications, including, for example, boiler systems, commercial and domestic HVAC systems, foundries and smelters, power generators, and specialized industrial applications. When a one or more burners of a multijet burner is damaged or otherwise fails, it is generally necessary to shut down the remaining burners to permit repair. Accordingly, multijet burners typically have a mean-time-between-failure (MTBF) that is approximately equal to the MTBF for each burner, divided by the number of burners.

SUMMARY

According to various embodiments, a multijet burner system includes a plurality of nozzles, each configured to support a respective flame, a plurality of charge electrodes, each positioned and configured to apply a charge potential to a fluid flow corresponding to a respective one of the plurality of nozzles, and a charge controller operatively coupled to each of the plurality of charge electrodes and configured to control a voltage potential applied to each respective charge electrode.

According to some embodiments, a charge controller is provided, configured to control operation of a multijet burner system, including controlling a charge potential applied to individual flames of the multijet burner system.

According to some embodiments, methods of operation are provided in which the magnitude and polarity of a charge potential applied to individual ones of the flames of a multijet system is controlled, and by which the flames can be made to change positions, move to selected positions, and redistribute themselves within a volume.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
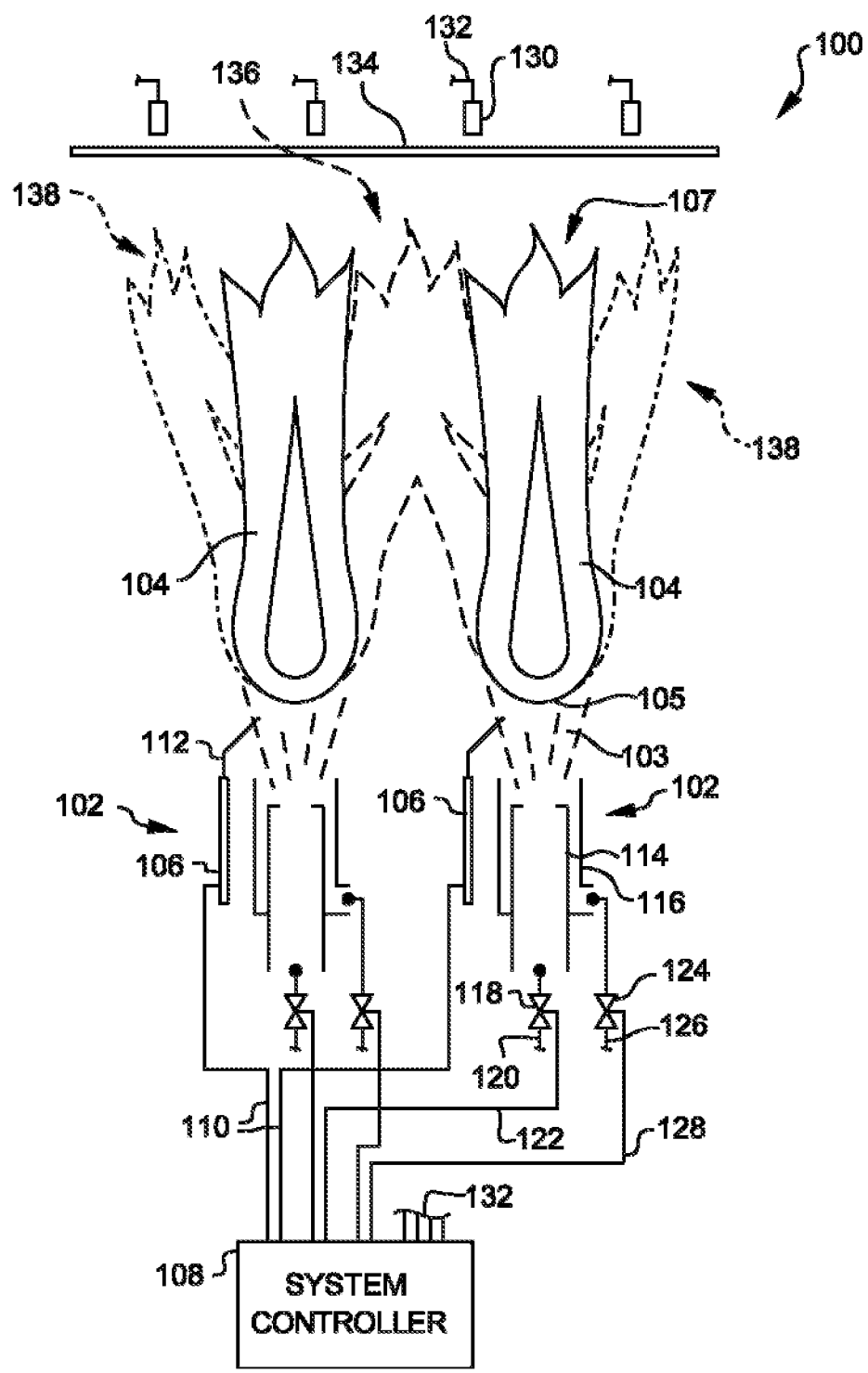
FIG. 1 is a diagrammatical view of a multijet burner system, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or other changes may be made without departing from the spirit or scope of the present disclosure.

In a multijet burner system, the individual burners are subject to damage and breakdown, primarily due to the high heat levels and hot reactive gases to which they are exposed. In a typical system that incorporates a multijet burner, when an individual burner malfunctions or must be shut down, the entire system must be promptly shut down, not only for repair, but to prevent damage to the system caused by uneven heat, and to avoid a loss of efficiency. Such a shutdown can be inconvenient and costly for the operator of the system, especially in cases where production must be suspended while the system is allowed to cool to a point where repairs can be made.

The inventors have recognized that in many cases, particularly where a multijet burner is operating at less than 100% capacity, the loss of the heat output of a single burner might not be a significant problem if the output of the remaining burners can be redirected to maintain a desired heat distribution. This would permit continued operation of the system until a shutdown could be done with less disruption and expense, and would extend the mean-time-between-failure (MTBF) of that system, even though the MTBF of the individual burners would remain unchanged.

According to another aspect, the inventors have recognized that in a multijet burner system (e.g., where all jets are working properly), additional advantages may be accrued by causing mixing action between the fuel jets or flames supported by the jets. For example, a fuel jet corresponding to a lean fuel mixture can be periodically mixed with a fuel jet corresponding to a rich fuel mixture to cause oscillating combustion having higher flame stability, lower carbon monoxide (CO) output, and/or lower oxides of nitrogen (NOx) output than a multijet burner having limited fuel jet or flame interaction. In another example, fuel jets corresponding to similar fuel mixtures may be made to mix with flue gas or air faster than a multijet burner where the fuel jets are not configured for charge interaction. In another example, interactions between fuel jets can be used to spread or move heat delivery across a larger surface or to avoid heat delivery to a portion of a heat transfer surface.

Moreover, charge interactions between fuel jets or flames supported by fuel jets provide an additional control modality to multijet burners. This additional control modality can be used to control fuel/oxidizer mixture in a manner that is independent from fuel flow. Linear independence between control modalities can result in more consistent NOx and/or CO reduction, and/or more stable flames across a wider range of burner heat outputs. This can be used to improve turn-down ratio, particularly in low NOx systems where turn-down ratio can be a challenge.

FIG. 1 is a diagrammatical view of a multijet burner system 100, according to an embodiment. The multijet burner system can, for example, form a portion of a heat transfer system, a boiler, a furnace, an industrial process, an electrical generation system, a propulsion system, etc. The system 100 includes two or more burners 102, each of which has a fuel nozzle 114 and an air channel 116. An optional valve 118 can regulate fuel flow from a fuel source 120 to the nozzle 114, and may be coupled to a system controller 108 via a control line 122. A damper, valve, blower or other apparatus 124 can regulate a flow of oxidizer from a source 126 to the air channel 116. The system controller 108 may control operation of the fuel and oxidizer valves to produce a flame 104.

In operation, fuel is supplied to each burner 102 and exits the nozzle 114 in an expanding fuel jet 103. The fuel jet 103 entrains oxidizer from the air channel 116 as the jet expands. Continuous combustion occurs in the fuel jet 103 at a distance from the nozzle 114 at which flame propagation, which travels as a flame front 105 moving essentially upstream in the fuel and oxidizer jet flow 103, is approximately equal in speed to that of the jet flow, moving in the opposite direction. Combustion occurs between the flame front 105 and the flame tops 107. Typically, a bluff body, perforated flame holder, or electrodynamic flame holder (not shown) provides a flow stagnation point, vortex flow, arc discharge, or an ion flow channel to stabilize the flame front 105.

Burner systems vary significantly in structure and configuration, in accordance with many different design factors, including, e.g., required heat output, duty cycle, application, cost, requirements related to fuel economy and emissions control, etc. In many systems, recirculated flue gas is mixed with the oxidizer stream to reduce the $O_2$ concentration while maintaining or increasing the total mass of the stream. In some systems, oxidizer volume is not actively controlled, but is drawn through a fixed aperture by venturi effect as the fuel exits the nozzle. Some systems provide a flame holder to fix the position at which combustion occurs. The formulation of the fuel and oxidizer can vary significantly, and some formulations can impose specific structural requirements on the burners. These and many other elements that are well understood in the art are not shown or described in detail, inasmuch as they are not essential to an understanding of the principles discussed below.

Returning to FIG. 1, a surface 134 is positioned above the burners 102 and represents a structure that is to be heated by flames supported by the burners. In practice, the structure can be, for example, a boiler, a heat exchanger, a smelting furnace, etc. In the embodiment shown, heat sensors 130 provide respective signals to the system controller 108, via signal lines 132. The system controller 108 is configured to control the operation of the burners 102 in accordance with temperature signals from the sensors 130 to maintain the temperature across the surface 134 within a selected range.

Charge electrodes 106 may be positioned adjacent to respective burners 102, and include electrode tips 112. Optionally, the charge electrodes 106 may be positioned to output charge to the fuel in or at the exit of the fuel nozzle. Optionally, the charge electrodes 106 may be positioned to output charge to air or flue gas in the air channel 116. Control lines 110 couple the charge electrodes 106 to respective input terminals of the system controller 108, which is configured to selectively apply a voltage potential to the electrodes 106.

The inventors have determined that an electrical potential can be imposed on a flame using any of a variety of structures, which are represented generically in the present disclosure by the charge electrodes 106. In practice, there is a number of structures that can be employed to apply a potential to a flame, including a charge injector, a corona discharge device, depletion electrode, inertial electrode, etc. Many such devices are described in detail in the following U.S. patent application Ser. No. 12/753,043, filed 1 Apr. 2010; Ser. No. 13/731,223, filed 31 Dec. 2012; and Ser. No. 13/730,979, filed 20 Dec. 2012, each of which is incorporated by reference in its entirety.

In the illustrated embodiment, the electrode tips 112 extend into contact with the fuel jets 103. According to another embodiment, the electrode tips 112 are positioned to extend into at least intermittent contact with the flame supported by the fuel jets and burners. According to another embodiment, the electrode tips 112 are positioned to be separated from the fuel jet 103 or flame 104 by a dielectric gap, into which a charge is ejected. According to a further embodiment, each electrode 106 is integral with the corresponding burner 102. In general, charge electrodes are configured to apply a charge potential to a fluid flow associated with a corresponding burner. The fluid flow can include fuel, oxidizer, fuel and oxidizer mix, flame, combustion gasses, exhaust gases, flue gases, reactive reagents, etc. In some embodiments, specific types of fluid flow are targeted, while in others, any or all of the types of fluid may be charged.

When a charge of sufficient magnitude is applied to a flame 104 charged ions are formed in the flame, having a polarity corresponding to the applied charge. The charge can be applied directly to the flame 104, or to the fuel jet 103 upstream from the flame as shown in FIG. 1, or even to combustion products downstream from the flame. When the flames 104 of adjacent burners 102 are charged at potentials having opposite polarities, the flames will become mutually attractive, and will move toward each other and even mix into a single flame, as shown in FIG. 1 at central position 136. Conversely, when the flames 104 of adjacent burners 102 are charged at potentials having a same polarity, the flames will become mutually repulsive, and will move away each other, as shown at spaced position 138.

In the case of a flame, the charge is understood to be the result of ions in the flame that are charged to a same polarity. Typically, an extremely high voltage potential is employed to generate a sufficient charge in a flame. According to an embodiment, a charge potential of between 1 kv and 50 kv (or more) is applied to the flames, at a same polarity or at opposite polarities, according to the desired result. According to another embodiment, a charge potential of between 1 kv and 50 kv is applied to a first one of the flames 104 while the second flame 104 remains neutral, or is grounded via the electrode 106, making the flames attract each other.

By selectively applying appropriate charge potentials to the flames 104 via the charge electrodes 106, the system controller 108 can cause the flame tops 107 of the flames 104 to move from their neutral positions toward a common central position 136, or to widely spaced positions 138. Thus, heat from the burners 102 can be concentrated near the center of the surface 134 or spread out over a large portion of the surface.

The temperature sensors 130 are shown as examples, only. According to other embodiments, a multijet burner system can include sensors positioned and configured to measure a flow of fuel or oxidizer to each burner, to detect a level of $O_2$ or other components in the flue gas, to detect malfunctions in the respective burners, etc. The sensor configuration is a matter of design choice, and is, in part, a function of the particular application and the system parameters that are to be controlled by the system controller.

Figure 2:
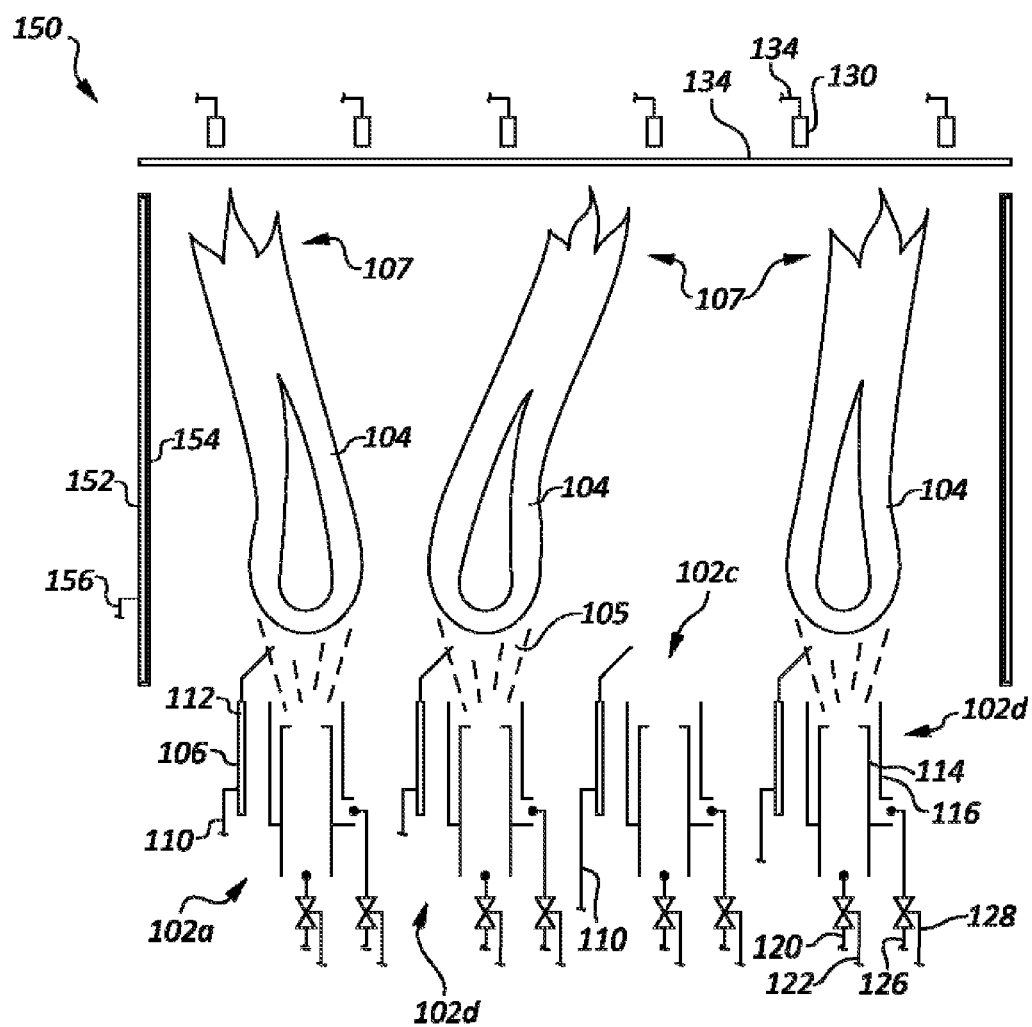
FIG. 2 a diagrammatical view of a multijet burner system, according to another embodiment.

Turning now to FIG. 2, a diagrammatical view of a multijet burner system 150 is provided, according to another embodiment. The system 150 includes four burners 102 that are substantially similar to the burners 102 described with reference to FIG. 1. The system 150 is configured to be operated by a system controller similar to the system controller 108 described with reference to FIG. 1.

The system 150 also includes a firebox liner 152 that is electrically conductive, and that includes a dielectric layer 154 positioned on the side of the liner facing toward the burners 102. The liner 152 is configured to be electrically coupled to a system controller via control line 156. Operation of embodiments that employ a firebox liner will be described in more detail below with reference also to to FIGS. 5-6.

FIG. 2 is provided to illustrate a method of operation, according to one embodiment. As shown, burners 102a, 102b, and 102d are in operation, while burner 102c is not. Burner 102c may be shut down, for example, in response to a malfunction of the burner or its controls. Accordingly, the flames 104 of the remaining burners 102 are charged at a potential having a same polarity, causing the flames to become mutually repulsive. Because the burners 102a and 102b are closely adjacent to each other, the mutual repulsion of their flames 104 will be relatively strong, causing them to move widely apart. Meanwhile, the burners 102b and 102d are not as closely positioned because the inactive burner 102c is positioned between them. Accordingly, the repelling forces between their respective flames 104 will be less strong. The imbalance of forces acting on the flame of the burner 102b will tend to push that flame some distance toward the flame of the burner 102d, so that it will seek an equilibrium of forces near a mid-point between the flames of burners 102a and 102d. Thus, the heat of the flames 104 of the three operating burners 102a, 102b, and 102d will be more evenly distributed across the surface 134.

Figure 3:
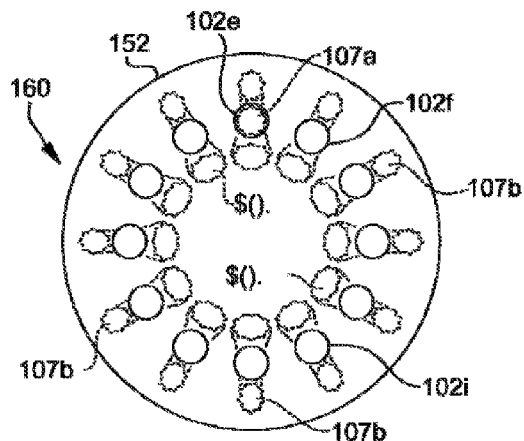
FIGS. 3-5 are diagrammatical top plan views of a multijet burner illustrating methods of operation, according to various embodiments.
Figure 4:
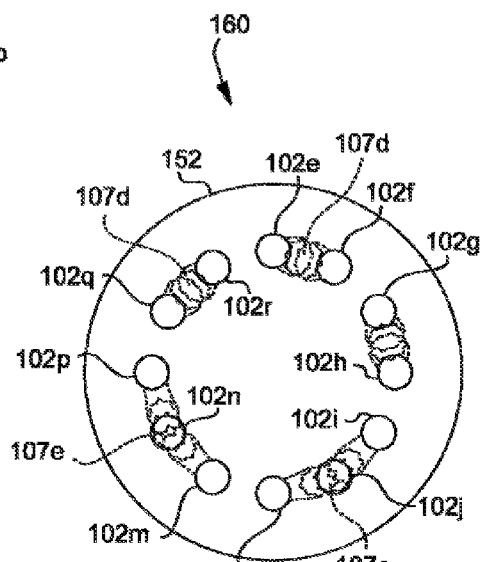
Figure 5:
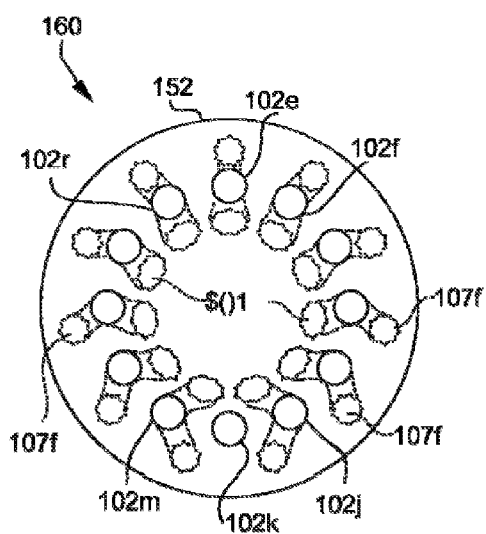

FIGS. 3-6 further illustrate the principles, as they relate to various methods of operation, according to various embodiments. FIGS. 3-5 are diagrammatical top plan views of a multijet burner 160, in which twelve individual burners 102 are arranged in a circular configuration within a flame box liner 152. The outlines of the burners 102 are shown, as are the flame tops 107 of flames supported by the respective burners, showing the positions of the flame tops under various conditions.

In FIG. 3, Flame top 107a is shown centered over burner 102e in a neutral position, i.e., the position it occupies when no charge potential is present. Because of the buoyancy of the flame and the momentum imparted by the fuel nozzle of the burner 102e, the flame rises substantially along a line that lies normal to the plane of the drawing, so that the burner 102e, flame, and flame top 107a are substantially coaxial. Only the flame top 107a corresponding to the burner 102e is shown in the neutral position, but it will be understood that when all of the burners 102 are in operation, with no charge potential applied, each of the burners will have a corresponding flame top centered over the respective burner.

As explained with reference to FIGS. 1-2, when a charge potential of a same polarity is applied to adjacent flames, the flames will tend to repel each other. In a system like the multijet burner 160, in which the burners are arranged in a circle, when a charge potential of a same polarity is applied to all of the flames 104, each of the flames will seek a position of widest separation from the flames on either side. Thus, the flames will tend to move radially outward from the center, so that the flame tops 107b take substantially evenly spaced positions that are radially displaced outward from the burners 102, as in the positions of the flame tops 107b shown in FIG. 3.

The strength of the repelling force between flames is a function of the magnitude of the charge applied to each flame, assuming a substantially equal magnitude of charge on each flame. Thus, the distance of displacement of the flame tops 107b can be controlled by varying the magnitude of the charge potential.

On the other hand, if the polarity of a charge applied to each flame is alternated around the circle, so that each flame is charged at a polarity that is opposite the polarity of the flames on either side, the flames of each of the burners 102 will be drawn radially inward toward the center of the circle, so that the corresponding flame tops will be displaced inward from their respective burners, as indicated in FIG. 3 by the positions of the flame tops 107c.

The strength of attraction between adjacent flames is a function of the magnitude of the difference in potential between the flames. Thus, by controlling the voltage level at which the flames are charged, the flames can be caused to move a small distance inward, or can be compelled to move much farther into the center, to overlap and mix with the adjacent flames. Additionally, if the charge potentials are applied unequally or asymmetrically, the flames can be caused to move toward a position that is off center relative to the positions of the burners, as some flames are attracted more strongly, while the attraction for others is weaker. Even flames carrying charges of the same polarity but of different magnitudes can become neutral or attractive to each other, depending on the difference in magnitude.

FIG. 4 shows the multijet burner 160 operating in accordance with embodiments in which the flames supported by the burners 102 are charged at selected potentials and/or polarities to produce various flame distributions. Two different charge patterns are shown, although they would not normally be used simultaneously. In a first pattern, the flames of burners 102e and 102f are charged at opposite polarities, so that they are attracted to each other. Meanwhile, the flame of burner 102g is charged at the same polarity of that of burner 102f, so that their flames repel each other, while the flame of burner 102h is charged at the opposite polarity, so that its flame is attracted to that of burner 102g. Thus, the flames of burners 102f and 102g are simultaneously repelled by each other and attracted by the flames of burners 102e and 102h, respectively. Similarly, the flame of burner 102*r* is charged at the same polarity of that of burner 102*e*, while the flame of burner 102*q* is charged at the opposite polarity of the flame of burner 102*r*. In this charging pattern, pairs of flames are drawn together to merge between the respective pairs of burners.

In the second illustrated pattern, the flames of burners 102*i* and 102*k* are charged at a same polarity while the flame of burner 102*j* is charged at the opposite polarity. Thus, the flames of burners 102*i* and 102*k* are both attracted to the flame of burner 102*j* between them, and are thus drawn together over the burner 102*j*. The same pattern is followed with the flames of the burners 102*m*, 102*n*, and 102*p*, except that the polarities are reversed, so that the flames of burners 102*k* and 102*m* will repel each other while being attracted by the flames on their respective opposite sides. In this charging pattern, the flames are merged in groups of three, where in the previous pattern, they are merged in groups of two.

Another charging pattern that can be used to produce the same effect, i.e., the merging of flames in groups of three, is to charge the flames of burners 102*i* and 102*k* at opposite polarities, while grounding the charge electrode of the burner 102*j*. In this way, both outer flames will be attracted to the central flame, but will also be attracted to each other, so that a stronger mutual attraction is formed among the three flames.

It will be recognized that other patterns and combinations of patterns can be devised and employed by those of ordinary skill in the art. These also fall within the scope of the disclosure.

FIG. 5 shows the multijet burner 160 operating in accordance with another embodiment, in which a method is provided for controlling heat distribution in the event of the loss of one or more burners. In FIG. 5, the burner 102*k* is not in operation. By applying a charge potential of the same polarity and magnitude to the flame of each of the burners in operation, the flames are caused to become mutually repellant, as described with reference to the flame top positions 107*b* of FIG. 3. However, because the flames will tend to seek a position at which the repelling forces are balanced, they will not necessarily move directly outward radially from their respective burners, but will redistribute themselves substantially evenly about the circumference of the circle, as represented by the flame tops 107*f* of FIG. 5.

Similarly, the flames can be caused to move inward from the burners while redistributing about the circle if alternating polarities of charges are applied to the respective burners, in a manner similar to that described with reference to the flame tops 107*c* of FIG. 3. However, a complication is introduced in a burner system that employs an odd number of burners, as is the effective condition of the multijet burner 160 of FIG. 5. If the polarity of the charge applied to each flame is alternated around the circle, the first and last flames will be at the same polarity. For example, if the flame of the burner 102*m* of FIG. 5 is charged at a positive polarity, with the polarity reversing for each burner clockwise around the circle, the burner 102*j* will also be at a positive potential, meaning that the flames of these two burners will repel each other, and will produce a gap in the distribution.

This problem can be resolved by grounding the charge electrode of one of the burners. For example, if the charge electrode associated with the burner 102*e* is grounded, and the charge electrode of the burner 102*f* is charged at a positive potential, their respective flames will be mutually attractive. Likewise, if the electrode of the burner 102*r* is charged at a negative potential, its flame will also be attracted to that of the burner 102. Alternating polarities clockwise from the burner 102*f* and counterclockwise from the burner 102*r*, means that the charge electrode of the burner 102*j* will be positively charged while the charge electrode of the burner 102*m* will be negatively charged, meaning that their corresponding flames will be mutually attracted, as intended.

Figure 6:
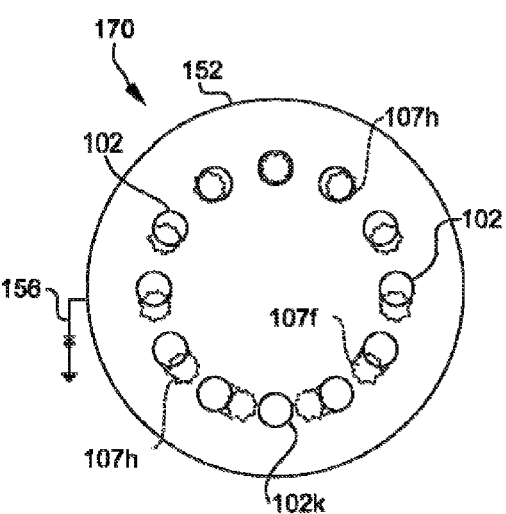
FIG. 6 is a diagrammatical top plan view of a multijet burner that is similar in most respects to the burner of FIGS. 3-5, and illustrates a method of operation according to another embodiment.

FIG. 6 is a diagrammatical top plan view of a multijet burner 170 that is similar in most respects to the burner 160 of FIGS. 3-5. However, the multijet burner 170 also includes a conductive flame box liner 152, which is configured to be operatively coupled to a system controller via a control line 156, similar to the arrangement described with reference to the multijet burner system 150 of FIG. 2. FIG. 6 is provided to illustrate a method, according to another embodiment, for responding to a loss of a burner. Burner 102*k* of the multijet burner 170 is inoperative, similar to the condition described with reference to the burner 160 of FIG. 5. A charge potential of a same polarity is applied to the flames of the operative burners, in a manner similar to that described with reference to the flame tops 107*f* of FIG. 5, causing the flames to become mutually repulsive.

However, in addition to the charge potential applied to the flames, the conductive liner 152 is coupled to a voltage source via the control line 156, as shown in FIG. 6, and charged at the same polarity as the charge applied to the flames. Thus, the flames are repelled by the charge applied to the conductive liner 152, causing them to move toward the center of the multijet burner 170, as illustrated in FIG. 6 by the positions of the flame tops 107*h*. By selectively controlling the magnitude of the charge potentials applied to the flames and the liner, the radial positions of the flames can be controlled. As shown in the drawing, the flames are held in position above the circle defined by the plurality of burners 102, but are redistributed more evenly around the circle.

A number of methods of operation have been disclosed above for applying a charge potential to flames of a multijet burner to cause selected interactions between the flames. In general, these have been presented in the context of responding to malfunctions of burners, etc. However, these and related methods can be practiced as part of the normal operation of a multijet burner. For example, in a system where individual burner output is fixed, it may be a common occurrence that the total output of the system exceeds the load requirements. In such a case, because burner output cannot be adjusted, either some portion of the heat produced is wasted, or the system is periodically shut down in a regular cycle. Shutting down and cold starting a large burner system can reduce efficiency and increase harmful emissions. According to an embodiment, the output of a burner system can be reduced by shutting down one or more burners of the system, while redistributing heat from the remaining burners as described above. By shutting each burner for a short period, then restarting that burner and shutting down another in a regular cycle, no single burner is down for a long enough period to cool down significantly, so that a hot restart can be performed, which reduces or eliminates the loss of efficiency and increase in harmful emissions that are common during a cold start. Additionally, the periodic down time can extend the useful life of each burner, effectively extending the MTBF of the system.

According to another embodiment, the flames of a multijet burner can be continually mixed to improve combustion or heat transfer efficiency, or reduce emissions.

In some systems there may be a tendency, under certain conditions, for the flames of individual burners to blow out. If a burner does not restart quickly, it can introduce unburnt fuel into the exhaust stream, which reduces efficiency and increases emissions. If flames are continually mixed by the application of the disclosed principles, any burner that blows out can be very quickly relit.

It should be noted that the practice of the disclosed processes does not require the application of a DC voltage potential to a flame or fuel jet. Where two flames are to be charged at a common polarity, this only requires that if an alternating polarity charge is applied, it should be applied to both flames in phase, so that even though the polarity of the charges continually changes, at any given instant, the polarity of the charges on both flames will be the same. Conversely, if two flames are to be charged at opposite polarities, an alternating charge polarity can be applied, provided the alternating cycles are 180 degrees out of phase.

If a charge potential is applied to the flames of a system for the purpose of causing the flames to mix and move energetically, it may be an advantage to use an alternating polarity voltage signal that is timed so that adjacent flames are about 90 degrees out of phase with each other. Such a configuration can be used to create a condition in which pairs of flames are alternately attracted and repelled, so that each flame can be caused to rapidly shift back and forth between the flames on either side.

In many cases it may be easier and less costly to use an alternating polarity signal, rather than a DC signal. For example, many of the various circuits and structures commonly used to produce high-voltage signals produce an alternating polarity signal, which must then be rectified if a DC signal is desired. By directly applying the alternating signal, the cost and complexity of the circuit can be reduced.

Where an alternating polarity signal is employed, the waveform will not necessarily be a typical sine wave. Because it generally requires a high-voltage signal to generate significant quantities of charged ions in a flame, a sine-wave shaped signal has periods during which insufficient charge magnitude is present. Preferably, an alternating signal that is employed as a charge potential is closer to an ideal square wave shape.

According to some embodiments, a signal that alternates between a high-voltage value and a low voltage or zero volts is employed. In such as case, the magnitude of a charge potential can be controlled by varying a duty cycle of the signal. This permits the use of a single high-voltage value to charge all of the flames of a multijet burner, while still enabling the individual selective control of the charge magnitude for each burner. Furthermore, as noted above, a pair of adjacent flames can be made to be mutually attractive even when they are both charged at the same polarity, provided there is a sufficient difference in magnitude of the charges. Accordingly, in some embodiments, attraction and repulsion of the individual flames of a multijet burner are controlled by regulation of the magnitude of the charge applied to each flame, rather than, or in addition to, controlling the polarity of the charge.

Figure 7:
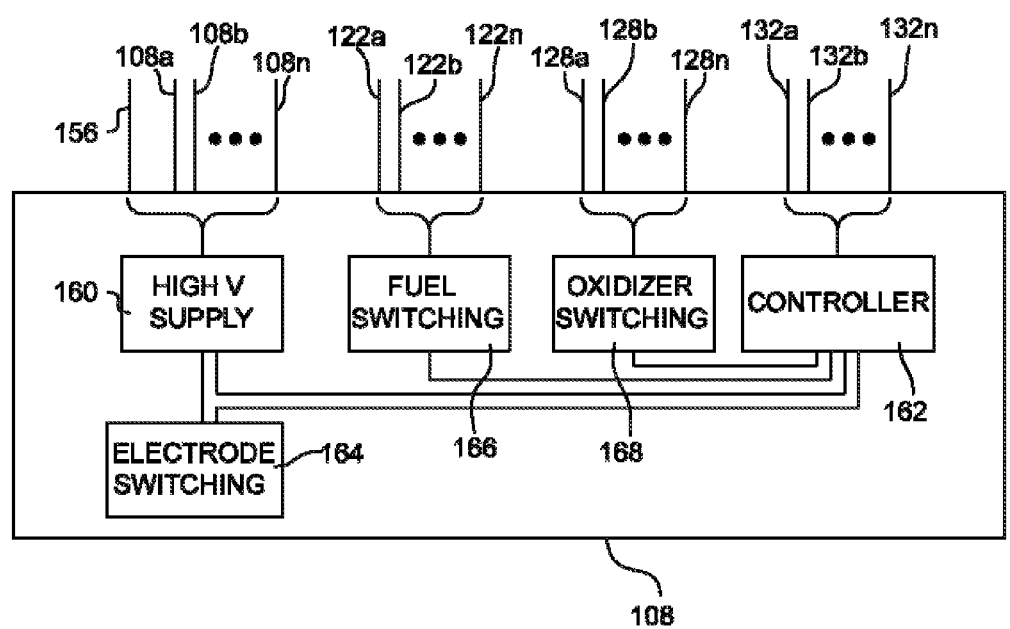
FIG. 7 is a diagrammatic view of a system controller configured to control the operation of a multijet burner, according to an embodiment.

FIG. 7 is a diagrammatic view of a system controller 108, according to an embodiment. The system controller 108 is configured to control the operation of a multijet burner such as those described above. The controller 108 includes: a plurality of output terminals 108a-108n configured to be coupled to respective charge electrodes; a plurality of output terminals 122a-122n configured to be coupled to the fuel valves of respective burners; a plurality of output terminals 128a-128n configured to be coupled to the oxidizer valves of respective burners; and a plurality of input terminals 132a-132n configured to be coupled to respective sensors. Also shown is an output terminal 156 configured to be coupled to a firebox liner of a multijet burner.

The system controller 108 includes a number of modules: a control module 162 configured to control operation of the other elements of the system controller 108, an oxidizer control module 168 configured to control a flow of oxidizer to each burner; a fuel control module 166 configured to control a flow of fuel to each burner; a charge control module 164 configured to control a charge potential present at each charge electrode; and a high-voltage supply 160 configured to provide high-voltage power for the charge electrodes.

The control module 162 receives data input from the sensor terminals 132 indicative of conditions and parameters of the multijet burner. Such data can include, e.g., temperature at selected locations in and around the burner, emissions of the burner, load requirements, ambient conditions, etc. The control module 162 is operatively coupled to the other modules of the system controller 108 in order to control their respective operations.

The control module also includes instructions by which it controls the operation of the burner system. The instructions can be in the form of software stored in a memory or other non-volatile storage medium, or can be in the form of firmware or hardware. The controller can be preloaded with a fixed set of instructions prior to installation, and/or may be programmable by the operator.

In addition to the sensor input terminals and control couplings previously mentioned, the control module 162 may also be configured with additional input and output terminals or couplings for receiving and sending data of various types. For example, terminals for user interface devices, i.e., keyboards, monitors, etc., may be provided to enable an operator to provide programming, select operating parameters, and observe the condition and status of the system. Other terminals may be provided to provide power to the controller 108, to permit connection of the controller 108 to other computers or networks, including the Internet, and to control other aspects of a system that incorporates the multijet burner.

The oxidizer control module 168 is operatively coupled to the output terminals 128a-128n and controls the operation of the oxidizer valves of the system. As previously noted, some systems do not actively control oxidizer volume, but provide a fixed aperture through which the oxidizer is drawn by the action of the fuel as it exits the nozzle. In such cases, of course, no oxidizer control module is required. In other systems, "EGR" (exhaust gas recirculation) is employed, in which recirculated flue gas is mixed with air or other gases and supplied as the oxidizer, in order to modify the combustion characteristics of the resulting flame. In such cases, the oxidizer control module 168 may be configured to control not only the flow of oxidizer, but also the proportions of the component gases in the oxidizer stream.

The fuel control module 166 is operatively coupled to the output terminals 122a-122n and controls the operation of the fuel valves of the system. In some systems, the fuel valves are configured to regulate the flow of fuel, and are controlled via signals from the fuel control module to adjust the volume of fuel in accordance with the instructions or programming of the control module 162. In other cases, the flow of fuel is a fixed volume, in which fuel pressure and nozzle aperture are fixed, and the fuel valves are simply controlled to open or close.

In some systems, fuel and oxidizer control is more complex, i.e., there are a number of additional parameters that are controlled to regulate the combustion characteristics of the burners, such as, for example, fuel pressure, EGR proportions, flame oscillation, flame damping, etc. In such systems, the additional parameters may be controlled via the fuel and/or oxidizer control modules, via additional modules, or directly by the control module.

The high-voltage supply module 160 is configured to provide a high-voltage signal to be applied to the charge electrodes, as determined by the charge control module 164. The high-voltage supply module 160 can include any of a number of different types of circuits that are configured to produce high-voltage power, as either alternating or direct-current signals, according to the configuration of the system control module, as explained in more detail below.

The charge control module 164 is operatively coupled to the output terminals 108a-108n and controls the operation of the charge electrodes of the multijet burner system. The charge control module 164 controls the polarity and magnitude of the voltage charges that are carried by the charge electrodes. In embodiments that include a terminal 156 configured to be coupled to a firebox liner or equivalent structure, the charge control module 164 can be configured to control the signal applied to that terminal, as well. Depending on the configuration of the system, the charge control module 164 may be configured to take a high-voltage signal and, via high capacity switches, selectively couple the high voltage to selected ones of the charge electrodes. However, in such an arrangement, the charge control module 164 is required to regulate signals at, sometimes, 40 kv or more, which can be difficult, and can require expensive switching components that are slower than typical switching circuits.

According to other embodiments, the charge control module 164 controls the magnitude and polarity of a relatively low-voltage signal, which is then amplified proportionately by the high-voltage supply module 160 and coupled to the selected charge electrodes. In this way, switching and modulation of the signals is done at lower voltages, which are then passed through the high-voltage supply module to be amplified to the desired potential. This is the configuration illustrated in FIG. 7, in which control signals from the charge control module 164 are passed through the high-voltage supply module 160 before being transmitted to the charge electrodes.

The high-voltage supply module 160 may include, for example, voltage multiplier circuits, which can be configured to repeatedly double an input voltage by a selected factor to produce a high-voltage, low current output signal. In contrast to a high-capacity switching element, such as, e.g., an IGBT transistor, which must be capable of withstanding the entire high voltage across its terminals, a voltage multiplier circuit is made up of a network of diodes and capacitors, none of which are exposed to the entire voltage, and none of which are required to switch on or off on command.

Various embodiments are a described above, in which each burner of a multijet burner is positioned adjacent to a respective charge electrode. According to other embodiments, each charge electrode is positioned to provide a charge potential to the fuel jet or flame of two or more burners, or to those of multiple nozzles within a respective burner.

The term "flue gas" is used here to refer to combustion products of the flames of a burner system, as well as any other gas (including, e.g., nitrogen, $CO_2$, CO, argon, NOx, etc.,) that has passed through the combustion reaction or is produced as a result of the combustion reaction.

Because the drawings are diagrammatic, they are not intended to show details of actual multijet burner systems, their components, or control elements, except where those details are specifically referred to and described. Otherwise, the drawings are intended to convey the function of the elements depicted. In particular, elements of known systems, such as burners and nozzles, valves, sensors, etc., are well known in the art, and can have any of a large number of shapes, structures, and arrangements, which vary widely according to system, manufacturer, capacity, model, etc. Even the structures that are described in some detail are provided as examples of various structures that can be employed, according to the preferences of a user or the limitations imposed by a particular burner system, and do not limit the claims to the particular structure, except where that structure is explicitly recited.

With regard to the system controller in particular, the controller is shown diagrammatically in FIG. 7 as an integrated unit, in which the various modules are contained within a single enclosure. While in some cases, a system controller will be self-contained, in many other cases, elements of the controller will be widely separated, with some element positioned near the burner, and others in remote locations. Furthermore, in many systems, functions of two or more of the modules may be performed by a single device or circuit, while in other systems, the functions of a single module may be shared between two or more devices. In some embodiments, the controller module includes a dedicated microprocessor device. In some embodiments, the controller includes a general purpose computer in which operations specific to the control a multijet burner system are performed in accordance with a software program. In some embodiments, the functions of the controller module are performed by a system that also performs other functions that are unrelated to the operation of a burner system. Accordingly, the claims are not limited to the structure or specific arrangement that is described or implied by the disclosure, but only by the language of the claims. Where controller functions are recited in a claim, any device or combination of devices that perform the recited functions falls within the scope of the claim.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A device, comprising:
   a plurality of burners, each configured to support a respective flame;
   a plurality of charge electrodes, each positioned and configured to apply a selected respective charge potential to a fluid flow corresponding to a respective one of the plurality of burners; and
   a controller operatively coupled to each of the plurality of charge electrodes and configured to cause a selected voltage potential to be applied to each respective charge electrode;
   wherein each of the plurality of charge electrodes is configured to output to the fluid flow, that corresponds to the respective one of the plurality of burners, an electrical charge corresponding to the selected voltage potential; and wherein the controller is configurable to alternatively cause a common voltage potential to be applied to each of the plurality of charge electrodes, and to independently control the respective voltage potential applied to each of the plurality of charge electrodes such that the respective flames supported by the burners are charged at selected different potential magnitudes and/or polarities, whereby the controller produces various flame distributions.

2. The device of claim 1, wherein each of the plurality of charge electrodes is positioned and configured to apply the charge potential to the fluid flow corresponding to at least two of the plurality of burners.

3. The device of claim 1, wherein the fluid flow corresponding to the respective one of the plurality of burners includes fluid flow corresponding to only one of the plurality of burners.

4. The device of claim 1, wherein each of the plurality of charge electrodes is positioned and configured to apply the charge potential to the fluid flow corresponding to the respective one of the plurality of burners and that includes at least one selected from the group consisting of a fuel stream, an oxidizer flow, a flowing fuel and oxidizer mixture, a flame supported by the fluid flow, a reactive reagent inserted into the fluid flow, and an inert charge carrier inserted into the fluid flow.

5. The device of claim 1, wherein each of the plurality of charge electrodes is positioned and configured to apply the charge potential to the fluid flow corresponding to the respective one of the plurality of burners and the fluid flow includes a flue gas.

6. The device of claim 5, wherein the flue gas is incorporated into an oxidizer flow of the respective one of the plurality of burners.

7. The device of claim 5, wherein the flue gas is incorporated into the flame supported by the respective one of the plurality of burners.

8. The device of claim 1, wherein the electrical charge generates majority charge carriers in a flame supported by the fluid flow.

9. The device of claim 8, wherein the majority charge carriers cause the flames supported by the fluid flows corresponding to at least two of the plurality of burners to interact with one another.

10. The device of claim 1, wherein each of the plurality of charge electrodes is configured to make at least intermittent contact with the flame supported by the respective one of the plurality of burners.

11. The device of claim 1, wherein each of the plurality of charge electrodes includes a charge injector configured to inject a charge into the fluid flow of the respective one of the plurality of burners.

12. The device of claim 1, wherein each of the plurality of charge electrodes includes a corona discharge device.

13. The device of claim 1, wherein each of the plurality of charge electrodes is directly coupled to the respective one of the plurality of burners.

14. The device of claim 1, wherein each of the plurality of charge electrodes and the respective one of the plurality of burners are a single, combined element.

15. The device of claim 1, wherein the controller is configured to cause a first voltage potential of a first polarity to be applied a first one of the plurality of charge electrodes while simultaneously causing a second voltage potential of a second polarity, opposite the first polarity, to be applied to a second one of the plurality of charge electrodes.

16. The device of claim 15, wherein the second one of the plurality of charge electrodes is positioned adjacent to the first one of the plurality of charge electrodes.

17. The device of claim 1, wherein the controller is configured to cause a voltage potential of a first polarity to be applied to a first one of the plurality of charge electrodes while simultaneously causing a voltage ground to be applied to a second one of the plurality of charge electrodes.

18. The device of claim 1, wherein the controller is configured to cause a voltage potential of a first polarity to be applied to a first one of the plurality of charge electrodes while simultaneously causing a voltage potential of a second polarity, opposite the first polarity, to be applied to a second one of the plurality of charge electrodes, and while simultaneously causing a voltage ground to be applied to a third one of the plurality of charge electrodes that is positioned between the first and second ones of the plurality of charge electrodes.

19. The device of claim 1 wherein the controller is configured to cause a voltage potential of a first polarity to be applied to a first set of the plurality of charge electrodes and to cause a voltage potential of a second polarity, opposite the first polarity, to be applied to a second set of the plurality of charge electrodes, wherein charge electrodes of the first set and charge electrodes of the second set are interleaved with each other.

20. The device of claim 1, wherein the controller is configured to distribute thermal emissions corresponding to the plurality of burners across a selected volume by selectively and independently controlling the respective voltage potential applied to respective ones of the plurality of charge electrodes.

21. The device of claim 1, wherein the controller is configured to selectively and independently cause a voltage potential applied to any of the plurality of charge electrodes to vary in response to a change in a condition of the device.

22. The device of claim 1, wherein the controller comprises a sensor input and is configured to cause the selected voltage potential applied to any of the plurality of charge electrodes to vary in response to a change in a signal at the sensor input.

23. The device of claim 1, wherein the controller comprises a plurality of sensor inputs and is configured to cause the selected voltage potential applied to any of the plurality of charge electrodes to vary in response to a change in a signal at any of the plurality of sensor inputs.

24. The device of claim 1, comprising a sensor operatively coupled to the controller and configured to detect a change in condition of the device.

25. The device of claim 24, wherein the sensor is one of a thermal sensor, a pressure sensor, a chemical sensor, and an electrical sensor.

26. The device of claim 24, wherein the sensor is one of a plurality of sensors operatively coupled to the controller.

27. A method, comprising:
supporting respective flames at each of a plurality of burners;
generating majority carriers in the flames supported by each of the plurality of burners by applying a respective charge potential to the flames; and
selecting a selected respective charge potential and/or polarity corresponding to the flame at each of the plurality of burners to interact with the charge potential and/or polarity of flames supported by others of the plurality of burners; and further comprising alternatively
   applying a common charge polarity and/or potential to each of the flames, and
   independently controlling the charge polarities and/or potentials such that the respective flames supported by the burners are charged at selected different potential magnitudes and/or polarities,
whereby the controller produces various flame distributions.

28. The device of claim 1, wherein the controller further comprises:
   a plurality of output terminals configured to be electrically coupled to respective ones of the charge electrodes;
   a switching module configured to selectably switch each of the plurality of output terminals between a plurality of the charge potentials; and
   a control module configured to control operation of the switching module.

29. The device of claim 28, comprising a voltage source capable of providing a voltage greater, in absolute value, than 1 KV.

30. The device of claim 28, comprising a voltage source capable of providing a voltage greater, in absolute value, than 10 kv.

31. The device of claim 28, comprising a voltage source capable of providing a voltage greater, in absolute value, than 40 kv.

32. The device of claim 28, comprising an input terminal coupled to the control module and configured to provide a sensor signal, the control module being configured to control the operation of the switching module according to the sensor signal.

33. The device of claim 32, wherein the input terminal is one of a plurality of input terminals coupled to the control module and configured to provide respective sensor signals.

34. The device of claim 28 wherein the control module is configured to control the switching module to independently apply a respective voltage to each of the plurality of output terminals.

35. The device of claim 28, wherein the control module is configured to control the switching module to cause a voltage of a first polarity to be applied a first one of the plurality of output terminals while simultaneously causing a voltage of a second polarity, opposite the first polarity, to be applied to a second one of the plurality of output terminals.

36. The device of claim 28, wherein the control module is configured to control the switching module to cause a voltage of a first polarity to be applied to a first one of the plurality of output terminals while simultaneously causing a voltage ground to be applied to a second one of the plurality of output terminals.

37. The device of claim 28, wherein the control module is configured to control the switching module to cause a voltage of a first polarity to be applied to a first one of the plurality of output terminals while simultaneously causing a voltage of a second polarity, opposite the first polarity, to be applied to a second one of the plurality of output terminals, and while simultaneously causing a voltage ground to be applied to a third one of the plurality of output terminals.

38. The device of claim 28 wherein the control module is configured to control the switching module to cause a voltage of a first polarity to be applied to a first set of the plurality of output terminals and to cause a voltage of a second polarity, opposite the first polarity, to be applied to a second set of the plurality of output terminals.

39. The device of claim 28, wherein the control module is configured to control the switching module to distribute thermal emissions corresponding to the plurality of burners across a selected volume by selectively and independently controlling the respective voltage potential applied to respective ones of the plurality of charge electrodes.

40. The device of claim 28, wherein the control module is configured to control the switching module to selectively and independently cause a voltage potential applied to any of the plurality of charge electrodes to vary in response to a change in condition of the device.

41. The device of claim 28, comprising a sensor input and wherein the control module is configured to control the switching module to cause the selected voltage potential applied to any of the plurality of charge electrodes to vary in response to a change in a signal at the sensor input.

* * * * *